(12) United States Patent
Fontenot et al.

(10) Patent No.: US 8,166,480 B2
(45) Date of Patent: Apr. 24, 2012

(54) REDUCING LOCK CONTENTION BY ADDING A TIME SLICE TO AN ACTIVE THREAD HOLDING A LOCK

(75) Inventors: Nathan D. Fontenot, Georgetown, TX (US); Jacob Lorien Moilanen, Austin, TX (US); Joel Howard Schopp, Austin, TX (US); Michael Thomas Strosaker, Austin, TX (US); Mark Wayne VanderWiele, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 864 days.

(21) Appl. No.: 12/181,811

(22) Filed: Jul. 29, 2008

(65) Prior Publication Data

US 2010/0031269 A1    Feb. 4, 2010

(51) Int. Cl.
G06F 9/46 (2006.01)
(52) U.S. Cl. .......................... 718/102; 718/103
(58) Field of Classification Search ............... None
See application file for complete search history.

(56) References Cited

U.S. PATENT DOCUMENTS

| | | | |
|---|---|---|---|
| 6,820,263 B1 * | 11/2004 | Klappholz | 718/108 |
| 2006/0037021 A1 * | 2/2006 | Anand et al. | 718/102 |
| 2006/0212876 A1 | 9/2006 | Buch | |
| 2006/0277551 A1 | 12/2006 | Accapadi et al. | |

OTHER PUBLICATIONS

Hohmuth et al., Pragmatic Nonblocking Synchronization for Real-Time Systems, 2001, pp. 1-15.*
Engler, The Exokernal Operating System Architecture, Oct. 1998, pp. 28-35.*

* cited by examiner

*Primary Examiner* — Eddie P Chan
*Assistant Examiner* — George Giroux
(74) *Attorney, Agent, or Firm* — Yee & Associates, P.C.; Steven L. Bennett

(57) ABSTRACT

Illustrative embodiments provide a computer implemented method, a data processing system and a computer program product for lock contention reduction. In one illustrative embodiment, the computer implemented method provides a lock to an active thread, increments a lock counter, receives a request to de-schedule the active thread, and determines whether the lock is held by the active thread. The computer implemented method, responsive to a determination that the lock is held by the active thread, adds a first pre-determined amount to a time slice of the active thread.

15 Claims, 3 Drawing Sheets

REDUCING LOCK CONTENTION BY ADDING A TIME SLICE TO AN ACTIVE THREAD HOLDING A LOCK

BACKGROUND OF THE INVENTION

1. Field of the Invention

The present invention relates generally to an improved data processing system and, more specifically, to a computer implemented method, a data processing system, and a computer program product for lock contention reduction.

2. Description of the Related Art

In many workloads, such as web serving or database processing, resource lock contention is a limiting factor in performance. Lock contention may typically represent 60% of the time required for a process to complete. Lock contention becomes especially relevant as the computing industry implements more multiple processor based environments.

In a typical scenario of lock contention, an active thread holds a lock and is scheduled out. The thread maintains the lock while not actively processing. Another thread attempts to use the resource and take the lock. This scenario is typically addressed with a technique known as lock boosting. Lock boosting occurs when a thread that attempts to take the lock held by a previous thread, boosts the priority of the thread that holds the lock. Lock boosting does not completely resolve the issue. In lock boosting, the thread holding the lock still gets de-scheduled and rescheduled in a number of scenarios. The problem of a lock being held by a dormant thread still exists.

BRIEF SUMMARY OF THE INVENTION

According to one embodiment of the present invention, a computer implemented method provides a lock to an active thread, increments a lock counter, receives a request to de-schedule the active thread, and determines whether a lock is held by the active thread. The computer implemented method responsive to a determination that the lock is held by the active thread, adds a first predetermined amount to a time slice of the active thread.

In another embodiment, a data processing system for lock contention reduction is provided. The data processing system comprises a bus, a memory connected to the bus, wherein the memory contains computer-executable instructions, a communications unit connected to the bus, a display connected to the bus, a processor unit connected to the bus, wherein the processor unit executes the computer-executable instructions to direct the data processing system to: provide a lock to an active thread, increment a lock counter, receive a request to de-schedule the active thread, determine whether the lock is held by the active thread, and responsive to a determination that the lock is held by the active thread, add a first predetermined amount to a time slice of the active thread.

In another embodiment, a computer program product for lock contention reduction is provided. The computer program product comprises computer-readable recordable type medium tangibly embodying computer-executable instructions thereon. The computer-executable instructions comprise computer-executable instructions for providing a lock to an active thread, computer-executable instructions for incrementing a lock counter, computer-executable instructions for receiving a request to de-schedule the active thread, computer-executable instructions for determining whether the lock is held by the active thread, and computer-executable instructions responsive to a determination that the lock is held by the active thread, for adding a first predetermined amount to a time slice of the active thread.

DETAILED DESCRIPTION OF THE INVENTION

Figure 1:
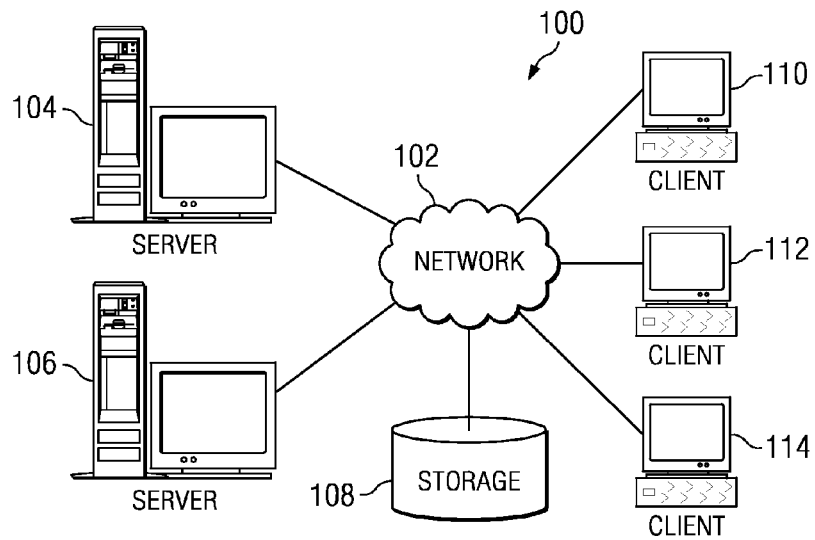
FIG. 1 is a pictorial representation of a network of data processing system in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (within the computer program product and including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products, according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus, to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer, or other programmable data processing apparatus, to function in a particular manner, such that the instructions stored in the computer-readable medium produce an article of manufacture, including instruction means which implement the function/act specified in the flowchart and/or block diagram block or blocks.

The computer program instructions may also be loaded onto a computer, or other programmable data processing apparatus, to cause a series of operational steps to be performed on the computer, or other programmable apparatus, to produce a computer implemented process, such that the instructions which execute on the computer, or other programmable apparatus, provide processes for implementing the functions/acts specified in the flowchart and/or block diagram block or blocks.

Figure 2:
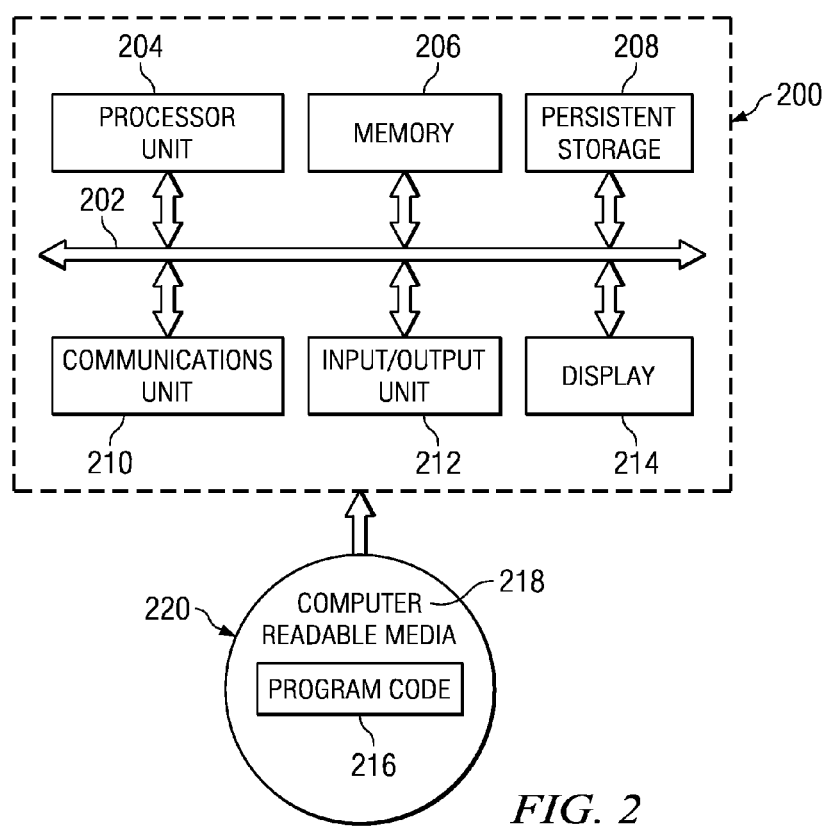
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

In an example scenario using system 100 of FIG. 1, a thread processing a request from a client 110 may execute instructions on server 104 through network 102. The thread may also lock a resource in the performance of the request, such as updating records on the server. When another request from client 112 is received to process the records being updated by client 110, lock contention occurs. When the thread executing for client 110 has used the time allotted, the thread is typically paged out and waits to be re-scheduled. In accordance with illustrative embodiments, a lock held counter is incremented. A modified scheduler checking to de-schedule a thread checks the "lock held counter" and determines the counter is set. The scheduler allocates that thread an extended time slice. The scheduler also sets a "de-schedule upon lock release" flag for that thread. In addition, the scheduler sets the thread's next time slice to be shortened to compensate for the extension in the current time slice. If the scheduler was checking to de-schedule and found the "de-schedule upon lock release" flag set, it would know the time slice had already been extended. If the time slice had already been extended once, the thread would be de-scheduled. By slightly extending the time slice for the thread holding a lock, the thread is more likely to complete processing requiring the lock. The lock would therefore have a greater chance of being released without the overhead of having context switches of other threads depending on the lock. Additionally, by having yield( ) called on the release of the lock, the thread would be less likely to hold any locks while not running, thereby reducing lock contention within and among systems.

With reference now to FIG. 2, a block diagram of a data processing system is shown, in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present, with secondary processors on a single chip.

As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-readable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system, including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

Figure 3:
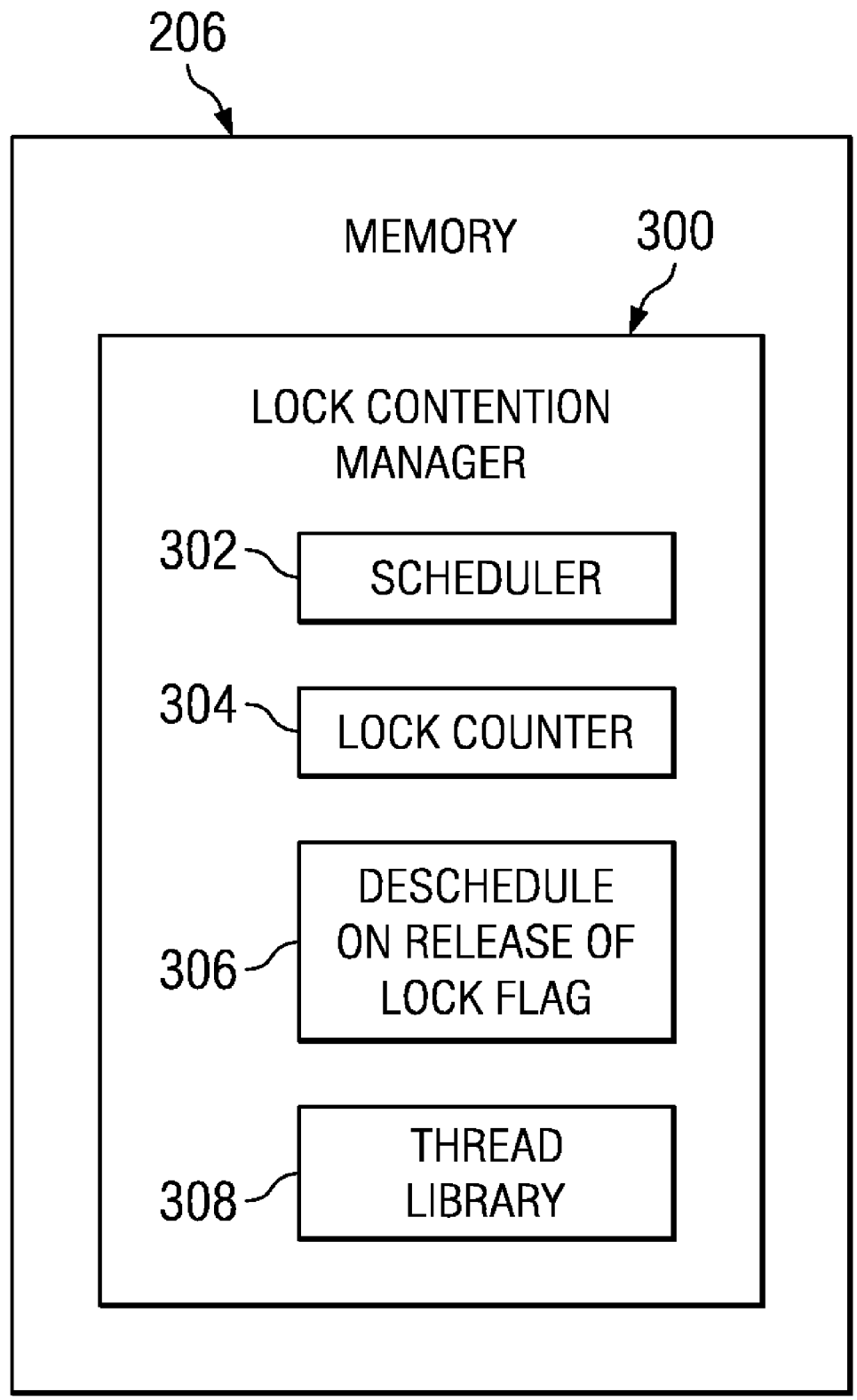
FIG. 3 is a block diagram of a lock contention manager, in accordance with illustrative embodiments.

FIG. 3 is a block diagram of a lock contention manager, in accordance with illustrative embodiments. Lock contention manager 300 is shown within memory 206 of system 200 of FIG. 2. Lock contention manager 300 may also be located within other memory, such as storage 108 of FIG. 1 until needed.

Lock contention manager 300 provides a common focus for installation, maintenance, and operation of the various components within the manager. Lock contention manager 300 consists of a number of components comprising a scheduler 302, a lock counter 304, a de-schedule on release of lock flag 306 and a thread library 308.

Scheduler 302 provides a capability to determine when to release threads or tasks for processing. The activity is known as scheduling. The scheduler controls when and for how long a thread may be permitted to execute. Scheduler 302 may incorporate various control mechanisms to prioritize tasks to maintain processing efficiency and throughput.

Lock counter 304 is a memory containing a count of a thread holding a resource lock. When a thread obtains a lock, such as when a record is to be updated, the lock counter is incremented. The count indicates the thread is holding a lock during processing. Upon completion of the activity associated with the resource the lock is released and the counter decremented.

A de-schedule on release of lock flag 306 is a memory containing an indicator of a thread state regarding the use of a lock. In this case, when the flag is set, the thread volunteers to be de-scheduled upon release of the lock being held.

The thread library 308 contains the executable code supporting the thread activities on the system on which the threads execute. The thread library contains the routines providing thread services to the users of those services. For example, services include those that start, stop and control threads.

Figure 4:
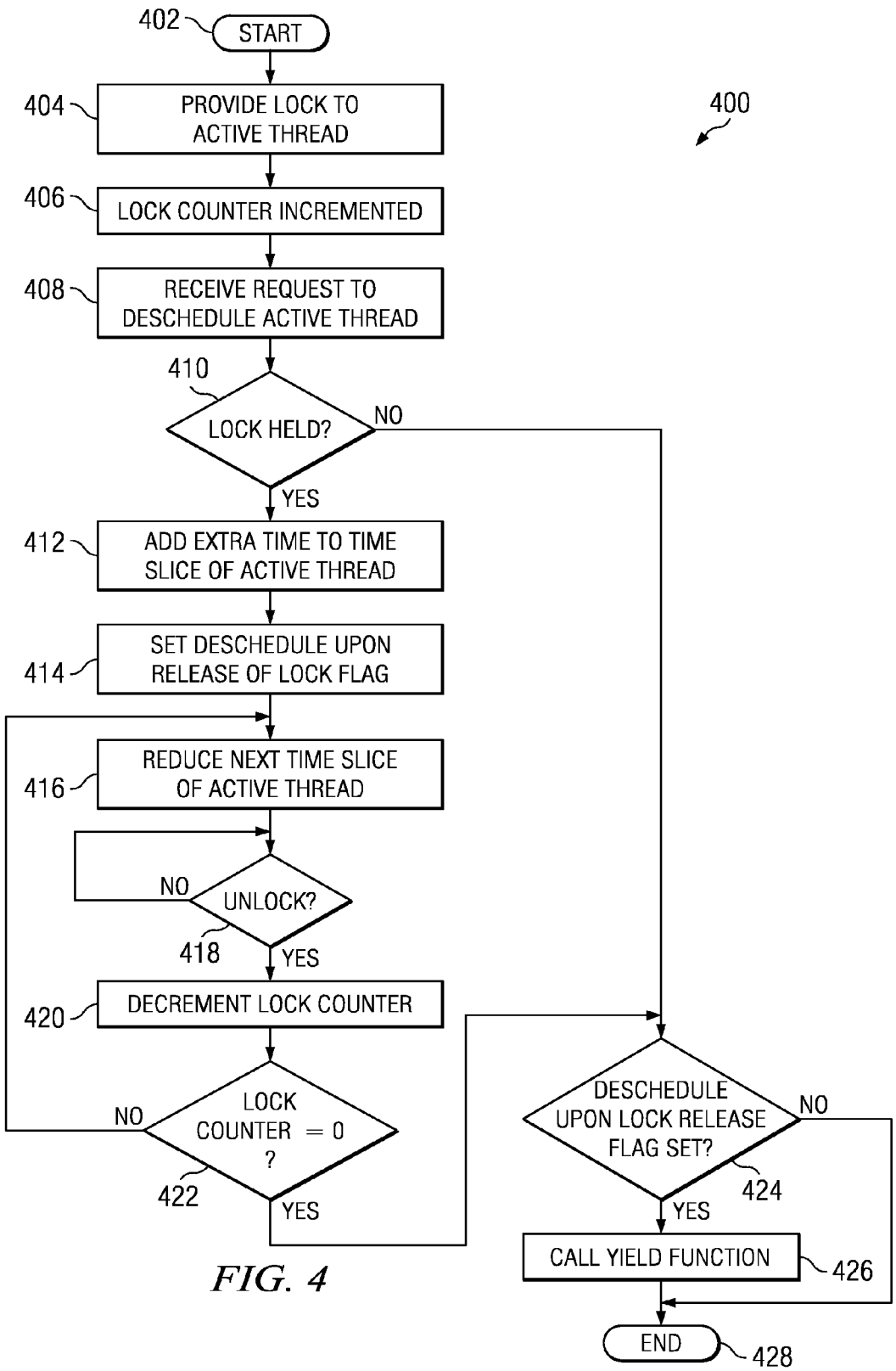
FIG. 4 is a flowchart of an example of a lock contention management process, in accordance with illustrative embodiments.

With reference to FIG. 4, a flowchart of an example of a lock contention management process, in accordance with illustrative embodiments, is shown. Lock contention management process 400 is an example using lock contention manager 300 of FIG. 3.

Lock contention management process 400 starts (step 402) and a lock manager or lock contention manager provides a lock to the active thread (step 404). A lock counter is incremented to indicate the acquisition of the lock by the thread (step 406). Normal thread-related processing occurs until the lock contention manager receives a request to de-schedule the active thread (step 408).

The scheduler component of the lock contention manager, determines if a lock is held by the active thread (step 410). When a lock is held, a "yes" result will be obtained in step 410. When there is no lock held, step 410 will return a "no" result. When a "yes" result is obtained in step 410, the scheduler will add extra time in the form of a first predetermined amount to the time slice of the active thread (step 412). Extra time is added to the allotted time for the thread to allow the thread to complete processing related to the lock being held. The extra time may allow the lock to be released normally. When a "no" result is obtained, process 400 jumps ahead to step 424.

A set de-schedule upon release of lock is performed to allow for a voluntary de-schedule when the thread is finished using the lock (step 414). This flag setting enables the thread to acknowledge lock release by de-scheduling. A thread that had received an extra time slice, but finished processing earlier than the time allotted, may then voluntarily de-schedule. When the thread holding a lock is eligible for another time slice, the scheduler will reduce the next time slice of the active thread (step 416). The reduction, in the form of a second predetermined amount, is made to ensure normal allocations are not altered in the long term of the thread operation. For example, to enable processing while holding a lock, a thread is issued a 5 unit time increase, for a first predetermined amount. The thread uses the extra 5 units of time, but the processing related to the held lock is still incomplete. The thread is then allocated a reduced allotment by 5 units of time, a second predetermined amount, to compensate for the additional 5 units received. Typically, the first and second predetermined amounts are equal, but need not be. The end result, in the example, is no time advantage to the thread in the attempt to complete processing while the lock was held.

A determination is made whether an unlock is required (step 418). When no unlock is required, a "no" will be obtained in step 418. When an unlock is required, a "yes" will be obtained. When a "no" is obtained in step 418, the process loops back to step 418 again. When a "yes" is obtained in step 418, a decrement lock counter is performed (step 420). When the unlock is performed, the corresponding lock count is reduced by a value of one.

The lock counter is then examined to determine if the lock counter has a value equal to "0" (step 422). If the determination is made that the lock counter is now "0," a "yes" results. If the determination is not "0," a "no" results. When a "no" results in step 422, process 400 loops back to step 416. When a "yes" result is obtained in step 422, a determination is made whether the de-schedule upon lock release flag is set (step 424).

When the determination is made that the de-schedule upon lock release flag is set, a "yes" is obtained. When the determination is made that the de-schedule upon lock release flag is not set, a "no" is obtained. When a "no" is obtained, process 400 terminates (step 428). When a "yes" result is obtained, a call to a yield function, or the equivalent, is made. The yield function or equivalent allows the thread to voluntarily de-schedule itself upon release of the lock. Process 400 terminates thereafter (step 428).

Illustrative embodiments provide three types of modifications to enable more efficient lock management. These modifications may typically be made in software libraries and kernel code alone. The modifications may also be made with additional hardware support, as desired. During locking, a lock held counter is incremented. The lock counter works for multiple locks and also for recursive locks. This lock counter may be implemented through use of a special register, other special hardware, a general purpose register, or a simple atomic increment of a memory variable. All of these solutions may be used to reduce lock contention. A software only solution would typically add a small processing overhead.

A modified scheduler about to de-schedule a thread checks the "lock held counter" to determine the setting. If the lock counter is set, the scheduler would give that thread an extended time slice. The scheduler would also set a "de-schedule upon lock release" flag for that thread. In addition, the scheduler would set the thread's next time slice to be shortened to compensate for the extension in the current time slice received. When the scheduler is ready to de-schedule and determines the "de-schedule upon lock release" flag is set, the scheduler realizes the time slice had already been extended. When the time slice has already been extended once, the thread may be de-scheduled.

During an unlocking operation, the lock held counter is decremented. After decrementing the lock held counter, the unlock routine checks the "de-schedule upon lock release" flag. When the "de-schedule upon lock release" flag is set, a yield( ), or equivalent function, is called to voluntarily end the thread's time slice while no lock is held. By slightly extending the time slice for the thread holding a lock, the thread is more likely to complete processing requiring the lock. The lock therefore has a greater chance of being released without the overhead of having context switches of other threads depending on the lock. Additionally, by having yield( ) called on the release of the lock, the thread is less likely to hold any locks while not running.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, the practical application, and to enable others of ordinary skill in the art to understand the invention for various embodiments, with various modifications as are suited to the particular use contemplated.

The invention can take the form of an entirely hardware embodiment, an entirely software embodiment (within the computer program product) or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for lock contention reduction, the computer implemented method comprising:
   providing a lock to an active thread;
   incrementing a lock counter;
   receiving a request to de-schedule the active thread;
   determining whether the lock is held by the active thread;
   responsive to a determination that the lock is held by the active thread, adding a first predetermined amount to a time slice of the active thread; and
   reducing a next time slice of the active thread during which the active thread is scheduled by a second predetermined amount that is not equal to the first predetermined amount.

2. The computer implemented method of claim 1 further comprising:
   setting a de-schedule upon release of lock flag for the active thread.

3. The computer implemented method of claim 1 further comprising:
   determining whether an unlock request is received; and
   responsive to a determination that the unlock request is received, decrementing the lock counter.

4. The computer implemented method of claim 2 further comprising:
   determining whether the lock counter is set to "0";
   responsive to a determination that the lock counter is set to "0", determining whether the de-schedule upon release of lock flag is set for the active thread; and
   responsive to a determination that the de-schedule upon release of lock flag is set for the active thread, de-scheduling the active thread upon lock release.

5. The computer implemented method of claim 1, wherein the time slice of the active thread is extended by the first predetermined amount only once prior to de-scheduling the active thread.

6. A data processing system for lock contention reduction, the data processing system comprising:
   a bus;
   a memory connected to the bus, wherein the memory stores computer-executable instructions;
   a processor unit connected to the bus, wherein the processor unit executes the computer-executable instructions to direct the data processing system to:
   provide a lock to an active thread;
   increment a lock counter;
   receive a request to de-schedule the active thread;
   determine whether the lock is held by the active thread;
   responsive to a determination that the lock is held by the active thread, add a first predetermined amount to a time slice of the active thread; and
   reduce a next time slice of the active thread during which the active thread is scheduled by a second predetermined amount that is not equal to the first predetermined amount.

7. The data processing system of claim 6, wherein the processor unit executes the computer-executable instructions to direct the data processing system to:
   set a de-schedule upon release of lock flag for the active thread.

8. The data processing system of claim 6, wherein the processor unit executes the computer-executable instructions to direct the data processing system to:
   determine whether an unlock request is received; and responsive to a determination that the unlock request is received, decrement the lock counter.

9. The data processing system of claim 7, wherein the processor unit executes the computer-executable instructions to direct the data processing system to:
   determine whether the lock counter is set to "0";
   responsive to a determination that the lock counter is set to "0", determine whether the de-schedule upon release of lock flag is set for the active thread; and
   responsive to a determination that the de-schedule upon release of lock flag is set for the active thread, de-schedule the active thread upon lock release.

10. The data processing system of claim 6, wherein the time slice of the active thread is extended by the first predetermined amount only once prior to de-scheduling the active thread.

11. A computer program product for lock contention reduction, the computer program product comprising, a computer-readable recordable type medium tangibly embodying computer-executable instructions thereon, the computer-executable instructions comprising:
   computer-executable instructions for providing a lock to an active thread;
   computer-executable instructions for incrementing a lock counter;
   computer-executable instructions for receiving a request to de-schedule the active thread;
   computer-executable instructions for determining whether the lock is held by the active thread;
   computer-executable instructions responsive to a determination that the lock is held by the active thread, for adding a first predetermined amount to a time slice of the active thread; and
   computer-executable instructions for reducing a next time slice of the active thread during which the active thread is scheduled by a second predetermined amount that is not equal to the first predetermined amount.

12. The computer program product of claim 11 further comprising:
   computer-executable instructions for setting a de-schedule upon release of lock flag for the active thread.

13. The computer program product of claim 11 further comprising:
   computer-executable instructions for determining whether an unlock request is received; and
   computer-executable instructions responsive to determining the unlock request is received, for decrementing the lock counter.

14. The computer program product of claim 12 further comprising:
   computer-executable instructions for determining whether the lock counter is set to "0";
   computer-executable instructions responsive to a determination that the lock counter is set to "0", for determining whether the de-schedule upon release of lock flag is set for the active thread; and
   computer-executable instructions responsive to a determination that the de-schedule upon release of lock flag is set for the active thread, for de-scheduling the active thread upon lock release.

15. The computer program product of claim 11, wherein the time slice of the active thread is extended by the first predetermined amount only once prior to de-scheduling the active thread.

* * * * *